United States Patent
Ogawa (10) Patent No.: US 10,200,591 B2
(45) Date of Patent: Feb. 5, 2019

(54) IMAGE PROCESSING APPARATUS, SYSTEM AND METHOD, WHICH CAN SEPARATE A PLURALITY OF OBJECTS WHOSE OBJECT DISTANCES ARE DIFFERENT

(71) Applicant: CANON KABUSHIKI KAISHA, Tokyo (JP)

(72) Inventor: Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 15/373,747

(22) Filed: Dec. 9, 2016

(65) Prior Publication Data

US 2017/0171459 A1 Jun. 15, 2017

(30) Foreign Application Priority Data

Dec. 14, 2015 (JP) .................................. 2015-243359

(51) Int. Cl.
*H04N 5/232* (2006.01)
*G02B 7/28* (2006.01)
(Continued)

(52) U.S. Cl.
CPC ......... *H04N 5/23212* (2013.01); *G02B 7/285* (2013.01); *G02B 7/365* (2013.01);
(Continued)

(58) Field of Classification Search
CPC .. H04N 5/23212; H04N 5/3656; G02B 7/285; G02B 7/365; G03B 13/36;
(Continued)

(56) References Cited

U.S. PATENT DOCUMENTS

| 4,956,660 A | * | 9/1990 | Takahashi | ................ G02B 7/34 396/104 |
| 5,093,562 A | * | 3/1992 | Okisu | ...................... G02B 7/34 250/201.8 |

(Continued)

FOREIGN PATENT DOCUMENTS

| JP | 2013-257512 A | 12/2013 |
| JP | 2015-102735 A | 6/2015 |

*Primary Examiner* — Nicholas G Giles
(74) *Attorney, Agent, or Firm* — Cowan, Liebowitz & Latman, P.C.

(57) ABSTRACT

An image processing apparatus includes a first phase difference detector configured to detect two phase differences in a range that contains a phase difference that provides the highest correlation between a pair of image signals, a comparator configured to compare a signal representative of a matching degree when the pair of image signals have a first phase difference among the two phase differences, and a signal representative of a matching degree when the pair of image signals have a second phase difference among the two phase differences, a signal separator configured to separate a pair of signal components relating to a specific object from the pair of image signals, based on a comparison result by the comparator, and a second phase difference detector configured to detect a phase difference that provides the highest correlation between the pair of signal components separated by the signal separator.

10 Claims, 8 Drawing Sheets

(51) Int. Cl.
*G02B 7/36* (2006.01)
*G03B 13/36* (2006.01)
*G06K 9/00* (2006.01)
*G06K 9/62* (2006.01)
*G06K 9/74* (2006.01)
*H04N 5/365* (2011.01)

(52) U.S. Cl.
CPC ......... *G03B 13/36* (2013.01); *G06K 9/00557* (2013.01); *G06K 9/6215* (2013.01); *G06K 9/745* (2013.01); *G06K 9/748* (2013.01); *H04N 5/3656* (2013.01)

(58) Field of Classification Search
CPC .. G06K 9/00557; G06K 9/6215; G06K 9/745; G06K 9/748
See application file for complete search history.

(56) References Cited

U.S. PATENT DOCUMENTS

| | | | | |
|---|---|---|---|---|
| 2013/0076970 | A1* | 3/2013 | Kishi | G02B 7/34 |
| | | | | 348/349 |
| 2016/0337576 | A1* | 11/2016 | Nobayashi | G01C 3/32 |
| 2017/0054910 | A1* | 2/2017 | Moriuchi | H04N 5/23267 |

* cited by examiner

IMAGE PROCESSING APPARATUS, SYSTEM AND METHOD, WHICH CAN SEPARATE A PLURALITY OF OBJECTS WHOSE OBJECT DISTANCES ARE DIFFERENT

BACKGROUND OF THE INVENTION

Field of the Invention

The present invention relates to an image processing apparatus, a distance detection apparatus, a focusing apparatus, an image capturing apparatus, an image processing method, and a non-transitory computer-readable storage medium.

Description of the Related Art

A conventional camera configured to detect a focusing state using a phase difference detection method cannot precisely detect the focusing state when there are two objects (main object and background) having different object distances in a focus detection area, due to a so-called perspective conflict in which these objects are simultaneously evaluated. Japanese Patent Laid-Open No. ("JP") 2013-257512 discloses a method for classifying pixels into a pixel that is close to an in-focus state and a pixel that is not, and for calculating each correlation. JP 2015-102735 discloses a method for classifying areas into an area close to an in-focus state and an area distant from the in-focus state, and for calculating each correlation.

Since JPs 2013-257512 and 2015-102735 separate both objects from each other using a principle in which when one of the long distance object and the short distance object has a high correlation, the other has a low correlation, the prior art require a sufficient distance between both objects. In other words, it is necessary to initially find a condition that provides a high correlation of the phase difference for one of the objects. When both objects are too close to each other, the correlation of the phase difference is high in a middle position between both the objects, and even the perspective conflict cannot be detected.

SUMMARY OF THE INVENTION

The present invention provides an image processing apparatus, a distance detection apparatus, a focusing apparatus, an image capturing apparatus, an image processing method, and a non-transitory computer-readable storage medium, which can highly precisely separate a plurality of objects having different object distances.

An image processing apparatus according to one aspect of the present invention includes a first phase difference detector configured to detect two phase differences in a predetermined range that contains a phase difference that provides the highest correlation between a pair of image signals obtained from light fluxes that have passed different exit pupil regions in an optical system, a comparator configured to compare a signal representative of a matching degree when the pair of image signals have a first phase difference among the two phase differences, and a signal representative of a matching degree when the pair of image signals have a second phase difference among the two phase differences, a signal separator configured to separate a pair of signal components relating to a specific object from the pair of image signals, based on a comparison result by the comparator, and a second phase difference detector configured to detect a phase difference that provides the highest correlation between the pair of signal components separated by the signal separator.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figures 1A, 1B:
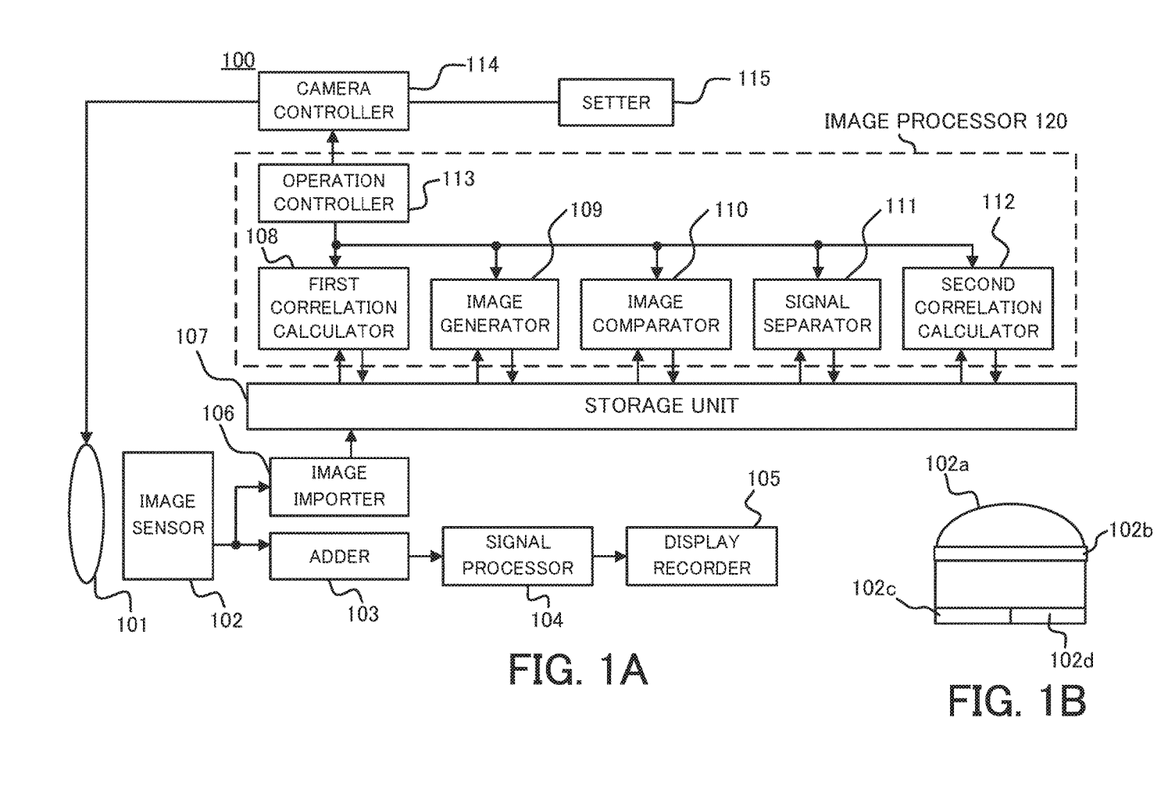
FIG. 1A is a block diagram of an image capturing apparatus.
FIG. 1B is a sectional view of an image sensor according to a first embodiment of the present invention.

FIG. 1A is a block diagram of an image capturing apparatus 100 according to a first embodiment. The image capturing apparatus 100 may be a digital camera, a TV camera, a cellular phone, a smart phone, etc. The image capturing apparatus 100 may be a lens integrated type or a lens interchangeable type, such as a single-lens reflex camera and a non-reflex camera (mirror-less camera). The image capturing apparatus 100 according to the first embodiment is the lens integrated type. The present invention is applicable to a distance detection apparatus, such as a digital distance measurement apparatus.

The image capturing apparatus 100 includes an image capturing optical system 101, an image sensor 102, an adder 103, a signal processor 104, a display recorder 105, an image importer 106, a storage unit 107, an image processor 120, a camera controller 114, and a setter 115. The image processor 120 includes, as illustrated by a dotted line in FIG. 1A, a first correlation calculator 108, an image importer 109, an image comparator 110, a signal separator 111, a second correlation calculator 112, and a calculation controller 113. The image processor may be separated from the image capturing apparatus 100, such as a dedicated image processing apparatus, and a personal computer (PC) in which an image processing method (program or software) is installed.

The image capturing optical system (imaging optical system) 101 forms an optical image of an object on an image capturing plane of the image sensor 102, and includes a zoom lens (magnification varying lens) configured to change a focal length, a diaphragm configured to adjust the light quantity, and a focus lens configured to provide focusing.

The image sensor 102, such as a CCD sensor and a CMOS sensor, photoelectrically converts the optical image formed by the image capturing optical system 101, and outputs an analog electric signal. An output of the image sensor 102 is converted into a digital electric signal by an unillustrated A/D converter, and supplied to the adder 103 and the image importer 106.

The image capturing apparatus 100 provides a focus detection of a phase difference detection method (phase difference AF). Herein, the phase difference AF is a focus detection method that provides a focus detection by detecting a phase difference of an image signal of a pair of object images (A and B images which will be described later) generated by light fluxes that have passed different exit pupil regions in the image capturing optical system 101. The phase difference AF may be executed by a dedicated AF unit, or the image sensor 102 may serve as the phase difference AF as in this embodiment.

FIG. 1B is a sectional view illustrating a pixel structure in the image sensor 102. The image sensor 102 includes a micro lens 102a, a color filter 102b, such as RGB, an A-image photoelectric conversion element 102c, and a B-image photoelectric conversion element 102d. A wiring layer, etc. is omitted. Each photoelectric conversion element includes a photodiode, and serves as a sub pixel. In a usual image sensor, the photoelectric conversion elements 102c and 102d form one photoelectric converter (pixel), but this embodiment divides photoelectric converter into a plurality of areas. The number of divisions and the dividing number are not limited. Since the two photoelectric conversion elements 102c and 102d share one micro lens 102a, the light fluxes that have passed the different exit pupil regions can be photoelectrically converted.

This embodiment arranges a plurality of photoelectric conversion elements 102c and 102d under the pupil-dividing micro lens 102a, and forms image signals of a pair of object images based on the outputs of these photoelectric converters. However, when the image sensor 102 serves as a phase difference AF unit, this embodiment is not be applied. For example, a light shield and a focus detection pixel are arranged under the micro lens, but image signals of a pair of object images may be formed by combining the outputs of two types of focus detection pixels having different opening positions in the light shield. In this case, an output of a focus detection pixel with a light shield having the left half opening and an output of a focus detection pixel with a light shield having the right half opening are combined.

The A image is an object image formed by a light flux that passes a first region in an exit pupil, such as half a region in the exit pupil, and the B image is an object image formed by a light flux that passes a second region different from the first region in an exit pupil, such as remaining half a region in the exit pupil. In each pixel, phases of the image signals of a pair of object images generated from the light fluxes that have passed different half regions in the exit pupil in the image capturing optical system 101 shift from each other. Thus, a defocus amount can be calculated and used to detect a focusing state by calculating a shift amount (phase difference) as a relative position relationship of the object images from the two image signals. In addition, the object distance can be calculated from a sum of the position of the focus lens and the defocus amount. Moreover, the image made by collecting the image signals from the photoelectric conversion element 102c and the image made by collecting the image signals from the photoelectric conversion element 102d have a parallax and a stereoscopic image can be obtained from this parallax. By adding the signals obtained from the photoelectric conversion elements 102c and 102d to each other, information of an object image having a pupil opening similar to the usual image sensor can be obtained.

The adder 103 adds the pupil-divided A and B image signals output from the image sensor 102 to each other and form a signal similar to that from the image sensor 102 having the usual Bayer arrangement.

The signal processor 104 performs image processing, such as a gamma process and a white balance, for the signal from the image sensor 102 and converts the signal into a video signal. The video signal is displayed on the display recorder 105 or processed or recorded. The display recorder 105 includes a display unit, such as a liquid crystal display, and a variety of memories, and a recorder, such as a removable medium.

The image importer 106 cuts a signal of a specific part (focus detection area) in the image used for the focus detection out of the signal obtained from the image sensor 102, converts the RGB signal into a luminance signal, and stores it in the storage unit 107. The storage unit 107 is a memory (storage unit), such as a ROM and a RAM. Thereafter, while a repetitive signal from the storage unit 107 is read and written, and a calculation process is performed.

The first correlation calculator 108 to the second correlation calculator 112 as sub modules perform processing under control of the calculation controller 113. The image processing according to the present invention is performed not for each block as disclosed in JP 2015-102735, such as an area corresponding to 20 pixels and 20 pixels in one image, but for each minimum processable data amount, such as a 8 bits in case of RGB data.

The first correlation calculator (first phase difference detector) 108 provides a first correlation calculation, and detects two phase differences (first phase difference and second phase difference) in a predetermined range that contains a phase difference that provides the highest correlation between the pair of image signals (for example, centering around the phase difference that provides the highest correlation). In this embodiment, the first phase difference is a phase difference that provides the highest correlation between the pair of image signals, and the second phase difference is a phase difference that provides the second highest correlation between the pair of image signals near the first phase difference. However, the present invention is not limited to this embodiment as long as the two phase differences are selected in the predetermined range that contains the phase difference that provides the highest correlation between the pair of image signals. The two phase difference is arranged close to each other so as to slightly move the virtual focal plane. The predetermined range is a range that does not contain another extreme different from the extreme of the phase difference that provides the highest correlation between the pair of image signals. The calculation controller 113 may detects the first phase difference and the second phase difference utilizing the result of the first correlation calculation performed by the first correlation calculator 108. In the first correlation calculation, a phase (shift amount) is calculated that provides the highest correlation (matching degree) by changing a shift amount (phase difference) of one of the A image and the B image to the other utilizing the SAD (Sum of Absolute Difference) calculating method. When a shift amount that provides a high correlation is known, a defocus amount is calculated by multiplying the shift amount by a predetermined coefficient determined by the baseline. The correlation calculation method is not limited to the SAD, and may use another method, such as SSD (Sum of Squared Difference) or NCC (Normalized Cross-Correlation).

The image generator 109 serves as a generator configured to generate an image signal of an absolute value of a difference (or |A−B|) when the A image and the B image have a shift amount that provides the highest correlation and a shift amount that provides the second highest correlation near (usually ±1 of) the shift amount that provides the highest correlation.

The image comparator 110 compares the two differences generated by the image generator 109 or subtracts one from the other, and stores the result in the storage unit 107. The image comparator 110 serves as a comparator configured to compare the signal representative of the matching degree when the pair of image signals have the first phase difference with the signal representative of the matching degree when the pair of image signals have the second phase difference. The calculation controller 113 may have this function.

The signal separator 111 serves as a signal separator configured to separate a pair of signal components from each other relating to a specific object from the pair of image signal, based on the output waveform (comparison result) by the image comparator 110, and stores the attribute information as the classification result of the A and B images in the storage unit 107. For example, the signal separator 111 separates the signal relating to the short distance object from the long distance object in the A image signal and separates the signal relating to the short distance object from the long distance object in the B image signal. The calculation controller 113 may have this function.

The second correlation calculator (second phase difference detector) 112 provides a second correlation calculation using the attribute information output from the signal separator 111, the A and B images imported by the image importer 106, and the method, such as the SAD. In other words, the second correlation calculator 112 detects a phase difference that provides the highest correlation between the pair of signal components separated by the signal separator 111. The second correlation calculator 112 performs a correlation calculation, for example, for the signal relating to the short distance object in the A signal and the signal relating to the short distance object in the B image signal, which have been separated by the signal separator 111. The second correlation calculator 112 may be integrated with the first correlation calculator 108. The calculation controller 113 may have this function.

The correlation controller 113 calculates a defocus amount, an object distance, etc. The camera controller 114 serves as a controller configured to control driving of (the focus lens in) the image capturing optical system 101 based on the output of the image processor, and controls each component in the image capturing apparatus 100. Each of the calculation controller 113 and the camera controller 114 includes a microcomputer, and may be integrated with each other.

The setter 115 serves as a setting unit (input unit) configured to enable a user to provide a setting, input, selection, etc. in the image capturing apparatus 100, and includes a button, a dial, a lever, a switch, a touch panel, a key, etc. For example, the setter 115 enables a user to set a focus detection area (AF frame). The calculation controller 113 calculates a defocus amount for the focus detection area by calculating the output signals from the focus detection pixels in the focus detection area. The focus detection area is displayed, for example, on a liquid crystal display in the display recorder 105 in the live-view.

Figure 3A:
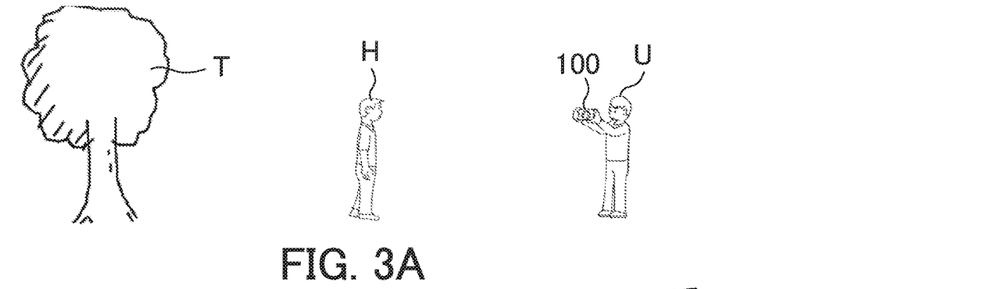
FIGS. 3A to 3D are views for explaining a perspective conflict according to the first embodiment.
Figure 3B:
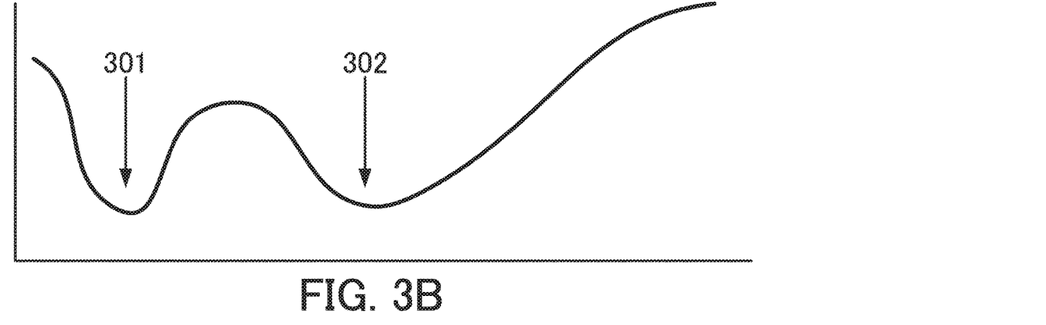
Figure 3C:
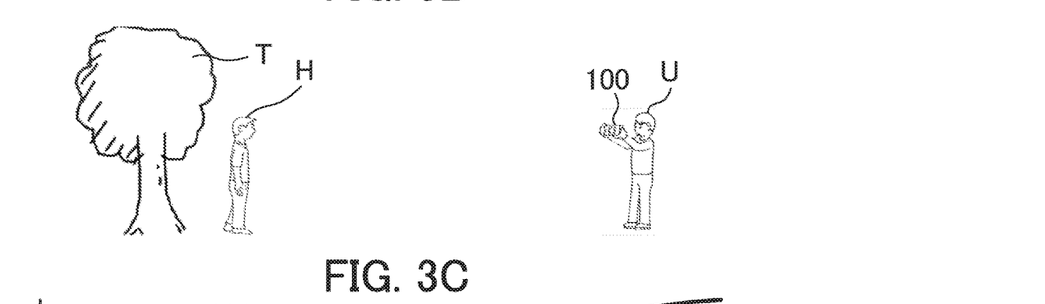

Referring now to FIGS. 3A to 3C, a description will be given of a perspective conflict solvable by the present invention.

FIG. 3A is a view illustrating a capturing state that causes the perspective conflict. The perspective conflict occurs when both a tree T in the background and a person H as a main object enter the focus detection area in the image capturing apparatus 100 held by a user U. FIG. 3B is a view illustrating correlation images calculated by the SAD in the state illustrated in FIG. 3A. FIG. 3B corresponds to FIG. 3A, and the abscissa axis denotes a shift amount (phase) and an ordinate axis denotes an evaluated value (SAD value) in FIG. 3B.

As the shift amount has a higher matching degree, the SAD value is smaller. It is thus necessary to detect a shift amount having the minimum SAD value. In the state illustrated in FIG. 3A, there are two locations having high matching degrees as illustrated in FIG. 3B. Reference numeral 301 corresponds to the defocus amount of the tree T in the background, and reference numeral 302 corresponds to the defocus amount of the person H. A method for separating the long distance object (tree T) and the short distance object (person H) from each other in this state is disclosed in JPs 2013-257512 and 2015-102735.

Figure 3D:
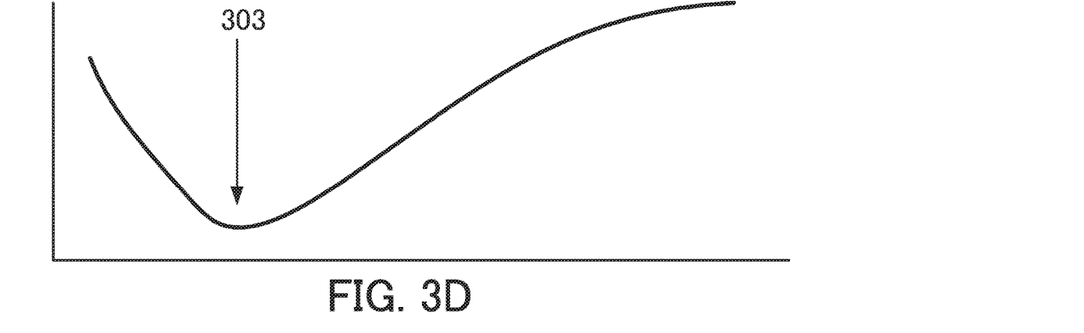

As illustrated in FIG. 3C, when the tree T and the person H are close to each other, a minimum is detected at one located at a middle position 303 between the background and the main object, as illustrated in FIG. 3D, and the long and short distance objects cannot be separated from each other by the methods disclosed in JPs 2013-257512 and 2015-102735. In addition, in FIG. 3D, the middle position 303 is focused and an image in which none of the objects is focused is captured. In FIG. 3D corresponding to FIG. 3C, the abscissa axis denotes the shift amount corresponding to and the ordinate axis denotes the evaluated value.

Figure 5:
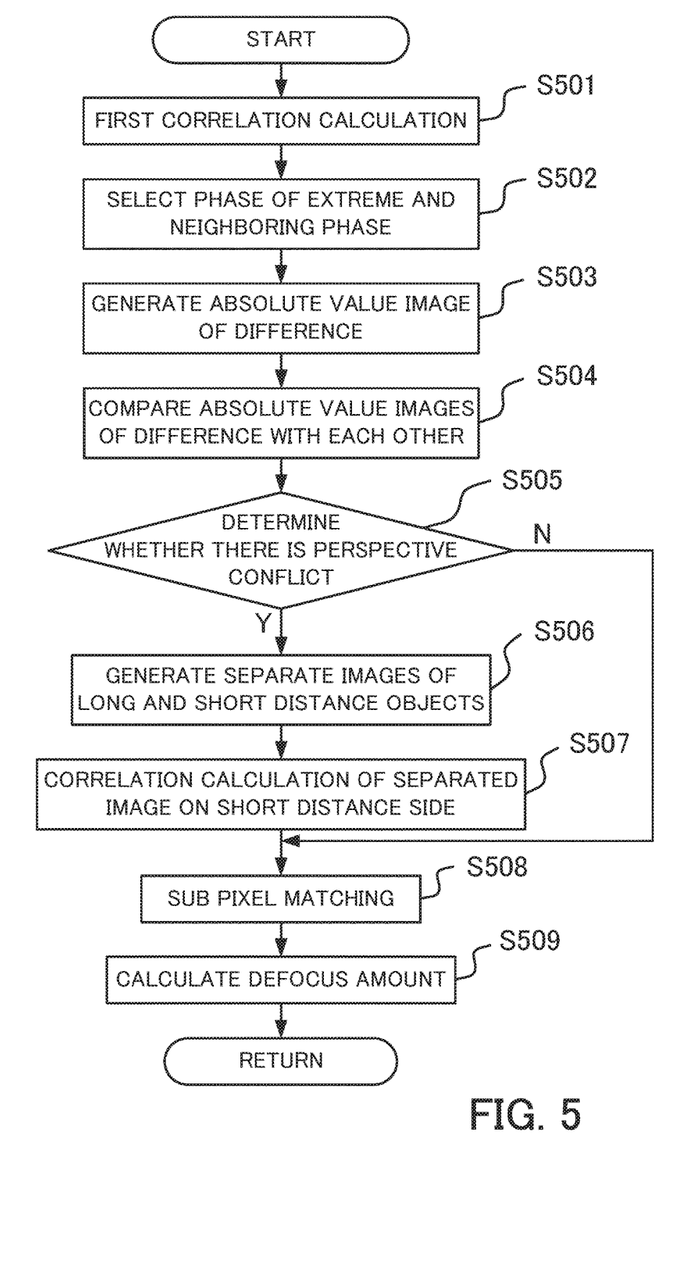
FIG. 5 is a flowchart illustrating an image processing method executed by the calculation controller illustrated in FIG. 1A according to the first embodiment.

FIG. 5 is a flowchart for explaining an image processing method executed by the calculation controller 113. In FIG. 5, "S" stands for the step, and the image processing method illustrated in FIG. 5 can be implemented as a program that enables a computer to execute each step. This program can be stored in a storage unit in the image capturing apparatus 100, such as the display recorder 105 and a non-transitory computer-readable storage medium.

The flow starts after both the A image and B image are stored in the storage unit 107. Assume that the storage unit 107 has recorded waveforms of the perspective conflict state illustrated in FIG. 2A. Reference numeral 201 denotes the A image signal, and reference numeral 202 denotes the B image signal. A left amplitude represents a long distance object, and a right amplitude represents a short distance object. The abscissa axis denotes a horizontal position, and the ordinate axis denotes a signal output value (luminance value) after a band-pass filter is applied.

Figure 4A:
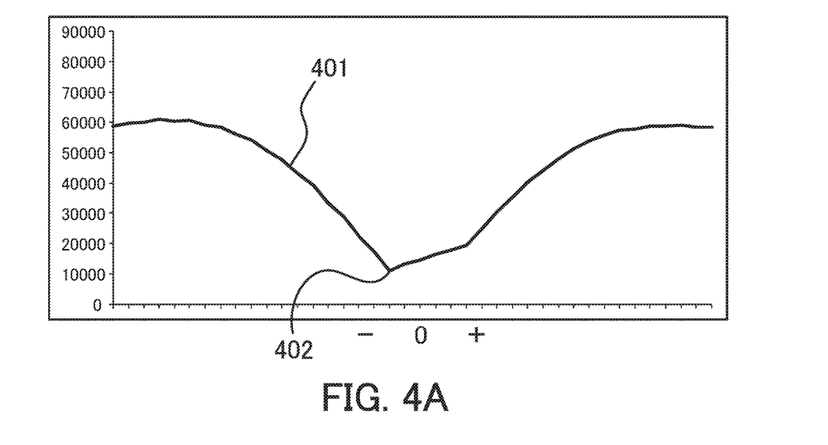
FIGS. 4A and 4B are views illustrating an output of a first correlation calculator illustrated in FIG. 1A according to the first embodiment.

Initially, in S501, the calculation controller 113 drives the first correlation calculator 108 and detects a shift amount that provides the highest correlation (or minimum value in the graph). FIG. 4A illustrates a signal 401 as a calculation result by the first correlation calculator 108. The abscissa axis denotes a shift amount, and the ordinate axis denotes a SAD value. A shift amount having a higher correlation is smaller. Since the signal 401 has only one extreme or minimum 402, the conventional method cannot precisely focus on the short distance object.

Next, in S502, the calculation controller 113 selects a shift amount (a first phase difference −3 in FIG. 4A) that provides the highest correlation between the A image and the B image, and a shift amount (second phase difference) that provides the second highest correlation between the A image and the B image near (usually ±1 of) the shift amount that provides the highest correlation. In the latter, herein, the calculation controller 113 selects a shift amount that provides the highest correlation between the A image and the B image, and one of two shift amounts ±1 of the shift amount that provides the highest correlation which provides the second highest SAD value (−4 in FIG. 4A).

Next, in S503, the calculation controller 113 twice drives the image generator 109, and generates an image signal of the absolute value of the difference at each time when the shift amount that provides the highest correlation between the A image and the B image, and when the shift amount that provides the second highest correlation between the A image and the B image near the shift amount that provides the highest correlation. The result is stored in the storage unit 107. S503 can be omitted.

Figure 2A:
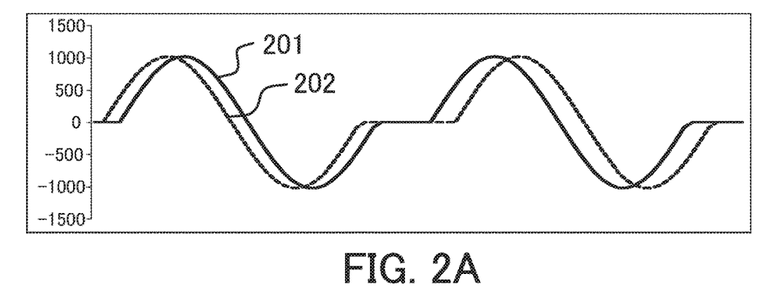
FIGS. 2A to 2D are signal waveform diagrams of an AF image and process states according to the first embodiment.
Figure 2B:
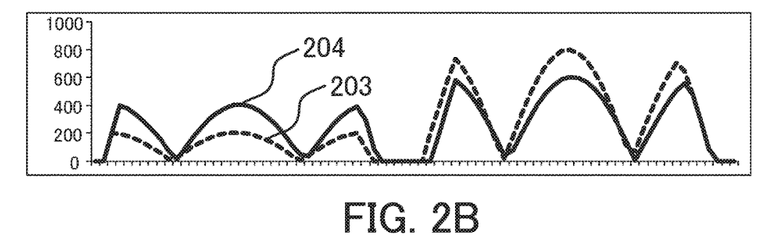

FIG. 2B is an absolute value image of the difference generated by the image generator 109. The abscissa axis denotes the horizontal position, and the ordinate axis denotes the absolute value of the difference. Reference numeral 204 denotes an image signal of the absolute value of the difference between the A image and the B image, when the A image and the B image have the shift amount that provides the highest correlation. Reference numeral 203 denotes an image signal of the absolute value of the difference between the A image and the B image, when the A image and the B image have the shift amount that provides the second highest correlation. It is understood that there is a magnitude difference between the image signals 203 and 204 on the left side and on the right side.

Figure 2C:
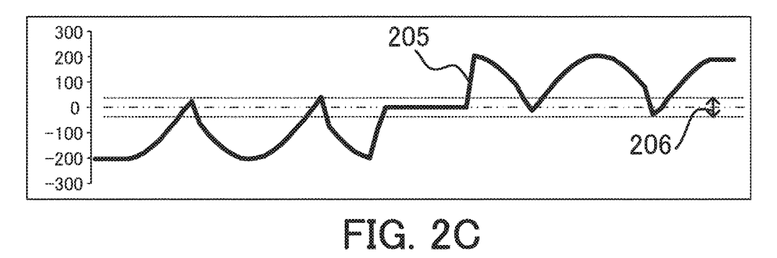

Next, in S504 (comparison step), the calculation controller 113 drives the image comparator 110 so as to compare the image signals 203 and 204 with each other, and generates a difference image signal between the two image signals 203 and 204. FIG. 2C illustrates a signal 205 output from the image comparator 110 configured to subtract the signal value of the image signal 204 from the signal value of the image signal 203. The abscissa axis denotes a horizontal position, and the ordinate axis denotes a signal output value after the band-pass filter is applied. Thus, the plus and minus signs inverses because the in-focus state of the short distance object improves as the position moves from the middle position 303 to the short distance object in FIG. 3C and the in-focus state degrades as the position moves from the middle position 303 to the long distance object.

Next, in S505, the calculation controller 113 determines whether there is a perspective conflict by analyzing the signal 205 from the image comparator 110 as the comparator (or detects the perspective conflict) The signal 205 oscillates centering around zero in the positive and negative directions. The first embodiment counts the number of sub pixels in the signal 205 oscillating in the plus or minus direction beyond a predetermined threshold range 206, and detects the perspective conflict using a ratio between the counted number on the plus side and the counted number on the minus side. The predetermined threshold range 206 is provided to avoid using this range because there are many noises near zero. The calculation controller 113 may determine whether there is a perspective conflict based on the output from the image generator 109 or the image importer 106 may determine whether there is a perspective conflict based on the information of the A image and the B image stored in the storage unit 107.

Next follows a description of the meaning of the calculation. The shift position of the minimum SAD value is a defocus amount on a virtual focal plane to the in-focus position, and the second shift position is located near the shift position of the minimum SAD value. It is one characteristic of the present invention to separate a signal that approaches to the in-focus state from a signal that recedes from the in-focus state, as the focus position moves from the virtual focal plane. If there is no perspective conflict and the position slightly shifts from the focus potion, all signals move away from the focal plane. When the long distance object and the short distance object exist with a ratio of 50:50, the subtraction result of the absolute image of the difference separates with a ratio of 50:50 between the plus side and the minus side.

After S501 in FIG. 5, the calculation controller 113 determines whether there is a perspective conflict illustrated in FIG. 3B, for example, based on the number of minimum values, and may separate the perspective conflict using the method in JP 2013-257512 without using the present invention in case of FIG. 3B.

Next, in S505, the calculation controller 113 determines whether there is a perspective conflict based on whether the ratio between the plus and minus sides of the subtraction result between the absolute value images of the difference exceeds the predetermined ratio. For example, even when the short distance object is 20% of the image and focusing on the short distance side is the expected design, the flow moves to S506 if the plus-minus ratio exceeds 8:2 and to S508 if the plus-minus ratio does not exceed 8:2.

In S506 (separating step), the calculation controller 113 generates the separated images of the long and short distance objects. The calculation controller 113 drives the signal separator 111, and stores in the storage unit 107 the attribute representative of whether the element in the data row belongs to the short distance object side or the long distance object side. No pixel belongs to both the short distance object side and the long distance object side, but a certain pixel may belong to none of them, because the predetermined threshold range 206 has a predetermined breadth.

Figure 2D:
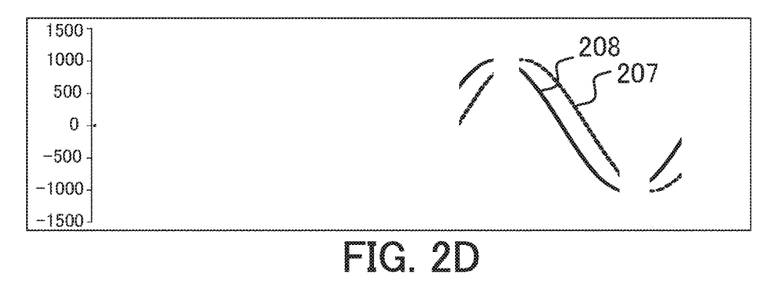

FIG. 2D is part of a signal waveform in FIG. 2A detected as the short distance object side. The ordinate axis and the abscissa axis are similar defined as those of FIG. 2A. Reference numeral 208 is a short distance object part in the A image signal 201, and reference numeral 207 denotes a short distance object part in the B image signal 202. This waveform illustrates only the detected, short distance object part. The storage unit 107 stores the attribute signal of each of the A image signal 201 and the B image signal 202.

Next, in S507, the calculation controller 113 performs the second correlation calculation for the signals 207 and 208. The first embodiment detects a focusing state by prioritizing a shorter distance. The calculation controller 113 drives the second correlation calculator 112, and performs the second correlation calculation.

Figure 6:
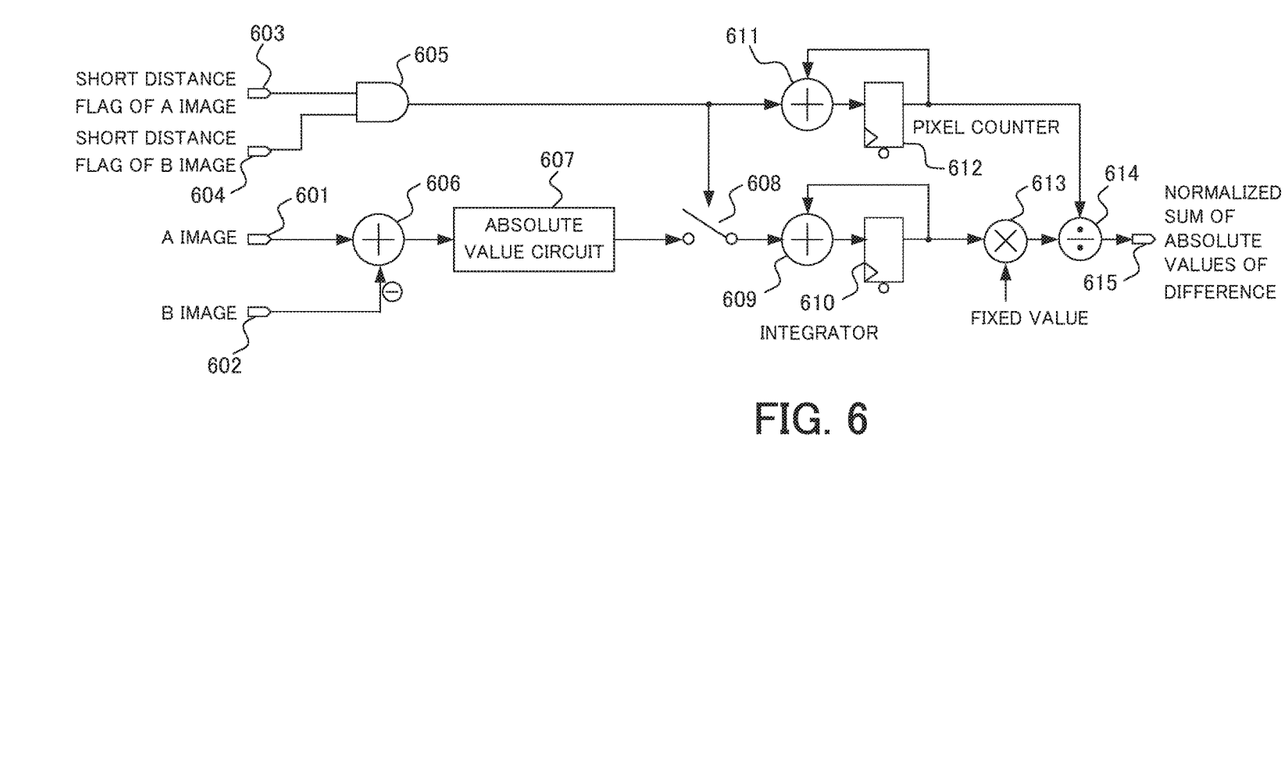
FIG. 6 is a circuit diagram of a normalized correlation calculation according to the first embodiment.

FIG. 6 is a circuit diagram illustrating an internal circuit of the second correlation calculator 112. For better understanding of the calculation, the interface unit and a variety of control signals with the storage unit 107 are omitted. The A image signal is input from a terminal 601. The B image signal is input from a terminal 602. A short distance flag for the A image is input from the terminal 603, and a short distance side for the B image is input from the terminal 604. The short distance flags for the A and B images is set (turns on) when the signal 205 illustrated in FIG. 2C for the A and B images are larger than the threshold 206.

When holders 610 and 612 are reset, signals input from the terminals 601 to 604 are prepared for each cycle. When signal inputs from all pixels end, the calculation result of the output terminal 615 is stored in the storage unit 107. A correlation amount corresponding to all phases is calculated by repeating the above calculation by shifting the phase difference one by one, and a correlation image is formed. The A and B images are subtracted from each other by an adder 606, and converted into the absolute value by an absolute value circuit 607. An AND circuit 605 outputs a signal closing a switch 608 only when both pixels opposite to the phases of the short distance flags for the A and B images are the short distance objects. A switch 608 serves to select one of a pair of image signals to be added to a sum of the absolute value of the difference based on a separation result by a signal separator. As a result, the output of the absolute value circuit 607 is sent to the subsequent integrator only when both A and B images are determined to be the short distance objects. The integrator includes an adder 609 and a holder 610. The adder 609 adds the value to the holder 610 that holds the previous value, and the holder 610 integrates the absolute value of the difference between the short distance object pixels.

The adder 611 and the holder 612 counts the number of cycles in which the switch 608 enables the value of the absolute value circuit 607 to pass. The adder 611 and the holder 612 form a pixel counter. The integrated value held by the holder 610 is multiplied by the fixed value by a multiplier 613, and then divided by a value of the holder 612 by a divider 614. The influence of the number of pixels that changes for each phase is normalized by this division. The divider 614 is designed to output an available maximum value when the denominator of the division is 0. The division 614 serves as a normalizer configured to normalize the sum of the absolute values of the difference using the added value of the absolute values of the difference.

Figure 4B:
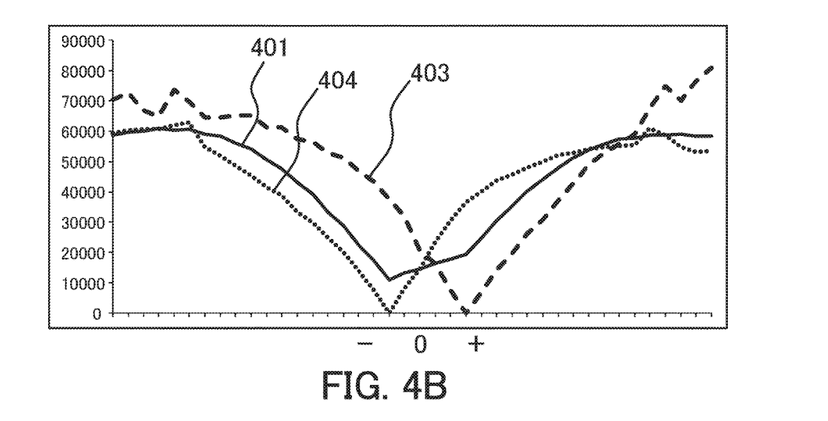

FIG. 4B illustrates a signal 403 of the short distance object obtained from an output terminal 615. Similarly, a signal 404 is a signal of the long distance object. It is understood that the minimum value of the short distance object that would not have been detected based on the original signal 401.

S508 from the correlation calculation result of the short distance object obtained in S507 or the flow from S505 provides sub pixel matching. In the SAD calculation, the phase can be changed only every one step, but the middle phase can be precisely calculated smaller than one step based on a change of the correlation amount. Although this embodiment performs processing called "parabola fitting," this process is not the characteristic of the present invention and a detailed description will be omitted.

Next, in S509, the calculation controller 113 converts the obtained phase difference into the defocus amount using the coefficient determined by the baseline of the pupil division. Thereafter, the processing ends, and the camera controller 114 takes over the control.

This embodiment performs a pupil division in the image sensor 102, but may use an AF dedicated sensor or a stereoscopic image. The first embodiment sequentially performs the processing using a plurality of modules, and may use a software instead of a hardware. While the short distance object is focused in the first embodiment, the long distance object may be focused or one of the short and long distance objects may be selected. While the first embodiment performs a focus detection by detecting a defocus amount, the first embodiment is applicable to a generation of a distance map (defocus map) or a determination of a refocus position.

Second Embodiment

Figure 8:
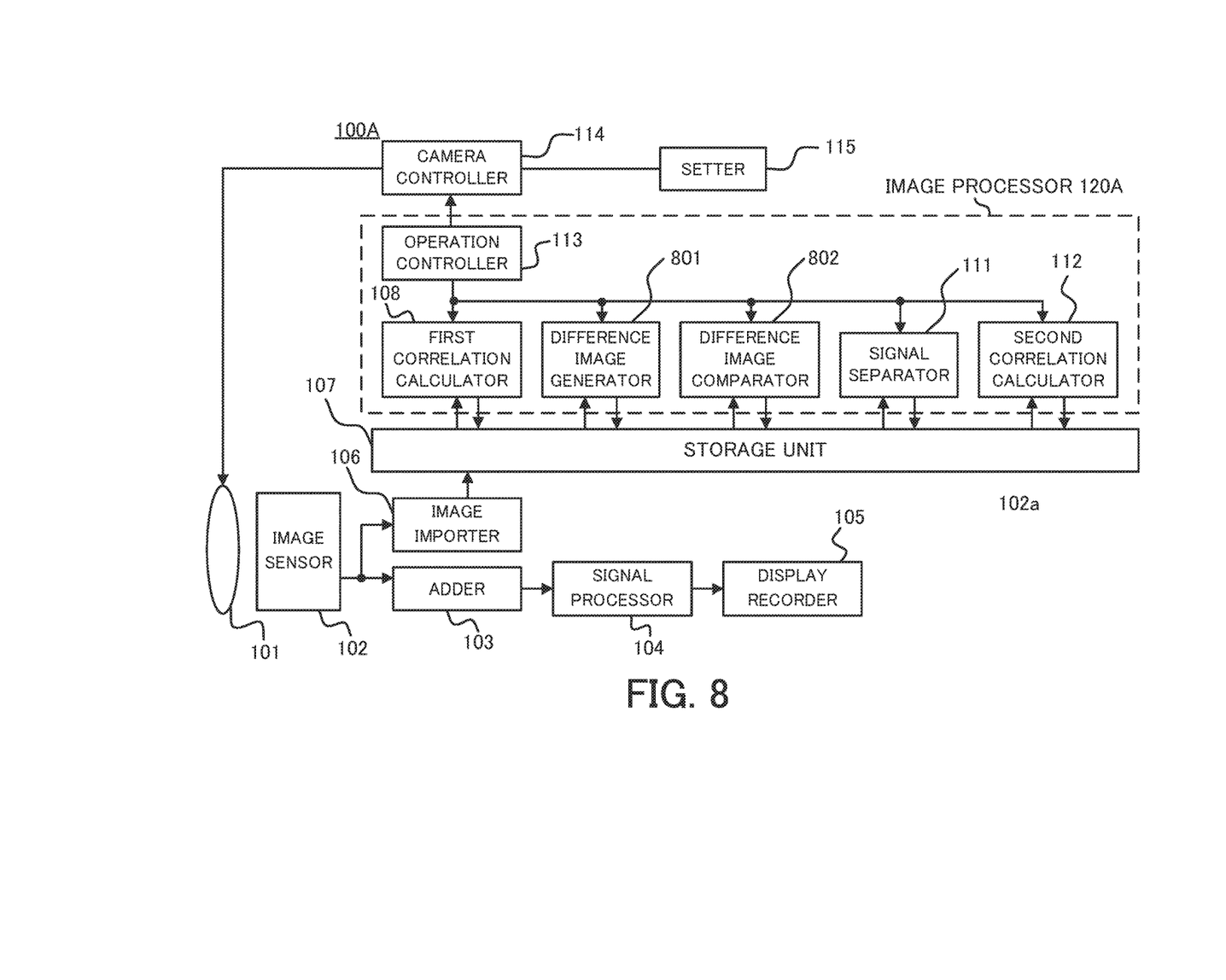
FIG. 8 is a block diagram of an image capturing apparatus according to the second embodiment of the present invention.

FIG. 8 is a block diagram of an image capturing apparatus 100A according to a second embodiment. The second embodiment is different from the first embodiment in that the second embodiment uses a difference image generator 801 instead of the image generator 109, and a difference image generator 802 instead of the image generator 110. FIG. 8 assigns reference numeral 120A to the image processor that contains these components. The second embodiment uses a difference image instead of the absolute value image of the difference.

Figure 7A:
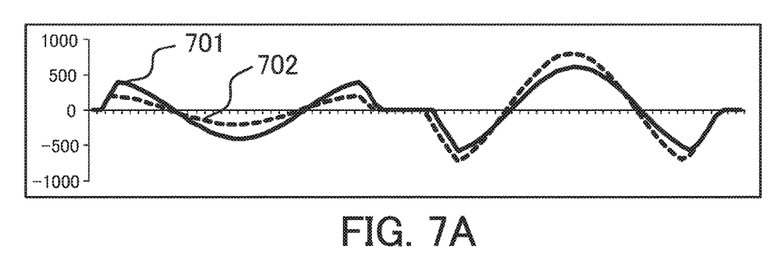
FIGS. 7A and 7B are comparative signal waveforms obtained by a second embodiment of the present invention.
Figure 7B:
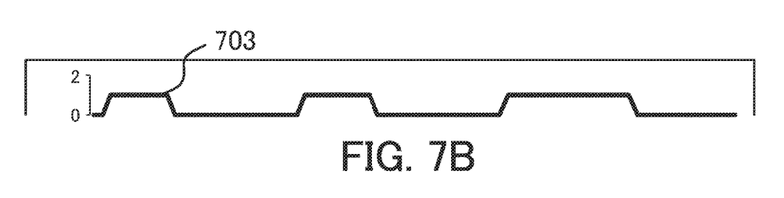

FIG. 7A is an output waveform from the difference image generator 801 when the two images are difference images illustrating the matching degree for each element of the data row obtained from the two phase differences. The second embodiment is different from the first embodiment in that the signal oscillates on the plus and minus sides. Reference numeral 701 denotes a signal corresponding to the A image. Reference numeral 702 denotes a signal corresponding to the B image. A difference image comparator 802 produces a signal 703 representative of the sign of the difference between the signals 701 and 702 so as to compare these two signals from each other, as illustrated in FIG. 7B. The thus obtained signal is the same signal as the signal 205 illustrated in FIG. 2C. The subsequent process is similar to that of the first embodiment, and thus a description thereof will be omitted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-243359, filed Dec. 14, 2015, which is hereby incorporated by reference herein in its entirety.

What is claimed is:

1. An image processing apparatus comprising:
    one or more processors; and
    memory storing instructions that, when executed by the one or more processors, cause the image processing apparatus to perform operations including:
        selecting two phase differences in a predetermined range that contains a first phase difference that provides a highest correlation between a pair of image signals which are output from a sensor photoelectrically converting light fluxes that have passed different exit pupil regions in an optical system, and a second phase difference in the predetermined range of the first phase difference;

comparing a data row of the pair of image signals when the pair of image signals have the first phase difference among the two phase differences, and a data row of the pair of image signals when the pair of image signals have the second phase difference among the two phase differences;

separating a pair of signal components relating to a specific object from the pair of image signals, based on a comparison result by the comparing; and detecting a phase difference that provides the highest correlation between the pair of signal components separated by the signal separator.

2. The image processing apparatus according to claim 1, wherein the comparing operation compares an absolute value of a difference between the pair of image signals when the pair of image signals have the first phase difference, and an absolute value of a difference between the pair of image signals when the pair of image signals have the second phase difference.

3. The image processing apparatus according to claim 1, wherein the comparing operation uses a signal of a difference between the pair of image signals when the pair of image signals have the first phase difference, and a signal of a difference between the pair of image signals when the pair of image signals have the second phase difference.

4. The image processing apparatus according to claim 1, wherein the detecting operation includes:

determining whether the pair of image signals are to be added to a sum of an absolute value of the pair of image signals, based on a separation result by the separating operation.

5. An image processing method comprising the steps of:

selecting two phase differences in a predetermined range that contains a first phase difference that provides a highest correlation between a pair of image signals which are output from a sensor photoelectrically converting light fluxes that have passed different exit pupil regions in an optical system, and a second phase difference in the predetermined range of the first phase difference;

comparing a data row of the pair of image signals when the pair of image signals have the first phase difference among the two phase differences, and a data row of the pair of image signals when the pair of image signals have the second phase difference among the two phase differences;

separating a pair of signal components relating to a specific object from the pair of image signals, based on a comparison result of the comparing step; and detecting a phase difference that provides the highest correlation between the pair of signal components separated by the separating step.

6. A non-transitory computer-readable storage medium configured to store an image processing method that enables a computer to execute a program, wherein an image processing method includes the steps of:

selecting two phase differences in a predetermined range that contains a first phase difference that provides a highest correlation between a pair of image signals which are output from a sensor photoelectrically converting light fluxes that have passed different exit pupil regions in an optical system, and a second phase difference in the predetermined range of the first phase difference;

comparing a data row of the pair of image signals when the pair of image signals have the first phase difference among the two phase differences, and a data row of the pair of image signals when the pair of image signals have the second phase difference among the two phase differences;

separating a pair of signal components relating to a specific object from the pair of image signals, based on a comparison result of the comparing step; and detecting a phase difference that provides the highest correlation between the pair of signal components separated by the comparing step.

7. The image processing apparatus according to claim 2, the comparing operation calculates a subtraction value obtained by subtracting an absolute value of a difference between the pair of image signals when the pair of image signals have the first phase difference from an absolute value of a difference between the pair of image signals when the pair of image signals have the second phase difference.

8. The image processing apparatus according to claim 7, the comparing operation determines a perspective conflict based on a number of pixels oscillating in a plus or minus direction beyond a predetermined threshold for the subtraction value.

9. The image processing apparatus according to claim 1, the comparing operation compares output waveforms when two images are difference images illustrating a matching degree for each element of a data row obtained from the two phase differences.

10. The image processing apparatus according to claim 9, the comparing operation determines a perspective conflict based on a difference between the output waveforms.

* * * * *